United States Patent [19]
Leaf et al.

[11] Patent Number: 5,509,393
[45] Date of Patent: Apr. 23, 1996

[54] VACUUM LOCKOFF APPARATUS AND METHOD

[75] Inventors: Curtis D. Leaf; Larry N. Drozdik, both of Madison, Ala.; John C. Hughes, Coon Rapids; Anthony T. Klejeski, Bethel, both of Minn.

[73] Assignee: Onan Corporation, Minneapolis, Minn.

[21] Appl. No.: 323,916

[22] Filed: Oct. 17, 1994

[51] Int. Cl.$^6$ .................................................. F02M 21/04
[52] U.S. Cl. ...................................... 123/529; 123/179.16
[58] Field of Search ................................ 123/527, 529, 123/198 DB, 179.16

[56] References Cited

U.S. PATENT DOCUMENTS

| | | | |
|---|---|---|---|
| 2,587,165 | 2/1952 | Jones | 123/529 |
| 2,632,430 | 3/1953 | MacSporran. | |
| 2,664,872 | 1/1954 | Ericson et al. | 123/529 |
| 3,220,393 | 11/1965 | Schlink. | |
| 3,710,770 | 1/1973 | Newkirk et al. | |
| 4,369,751 | 1/1983 | Batchelor et al. | 123/527 |
| 4,483,302 | 11/1984 | Mannessen | 123/529 |
| 4,721,078 | 1/1988 | Watanabe et al. | |
| 5,146,903 | 9/1992 | Baverstock | 123/527 |
| 5,357,935 | 10/1994 | Oxley et al. | 123/527 |
| 5,377,647 | 1/1995 | Jones | 123/527 |

*Primary Examiner*—Erick R. Solis
*Attorney, Agent, or Firm*—Merchant, Gould, Smith, Edell, Welter & Schmidt

[57] ABSTRACT

A system for regulating fuel flow in a fuel line from a supply of fuel to an engine, comprising: a fuel regulator disposed in the fuel line intermediate of the engine and the fuel supply regulating the flow of fuel to the engine; vacuum lockoff apparatus, disposed in the fuel line intermediate of the fuel regulator and the fuel supply and connected to the engine by an air passageway, sensing a partial vacuum condition at the engine, the vacuum lockoff means allowing flow of fuel in the fuel line when a partial vacuum condition is sensed and prohibiting flow of fuel in the fuel line when the partial vacuum condition is no longer sensed; one way check valve, disposed intermediate of the engine and the vacuum lockoff means in the air passageway, maintaining partial vacuum condition at the vacuum lockoff means; and bypass valve means, connected to the air passageway so as to provide an air passageway bypassing the one way check valve, for allowing restricted flow of air to the vacuum lockoff apparatus whereby the partial vacuum condition at the vacuum lockoff apparatus is nullified in a predetermined period of time so that fuel flow is prohibited once the engine has been stopped for the predetermined period of time.

6 Claims, 1 Drawing Sheet

VACUUM LOCKOFF APPARATUS AND METHOD

TECHNICAL FIELD OF THE INVENTION

The present invention relates to a vacuum lockoff apparatus and method for use with a liquid propane (LP) engine.

BACKGROUND OF THE INVENTION

Traditional LP engines have a vacuum lockoff device in their LP fuel system line. The vacuum lockoff device allows LP flow to the engine when a vacuum at the intake manifold is sensed by the vacuum lockoff device. When the vacuum lockoff device does not sense any vacuum in the intake manifold, LP flow in the fuel line to the carburetor is prohibited. A vacuum condition at the intake manifold is created when the engine is running or being cranked such as during starting. As long as the engine is running LP flow to the engine is allowed. When the engine stops, LP flow to the engine is prohibited. Accordingly, the vacuum lockoff functions as a safety device to make sure that LP flow to the engine is prohibited when the engine is shut off.

Such vacuum lockoff devices can make starting an LP engine difficult. As the engine is being cranked, the vacuum condition at the intake manifold is rather tenuous and fluctuates between a vacuum condition and a non-vacuum condition. Moreover, between recoil start pulls, a vacuum condition does not exist and LP fuel flow is prohibited.

The present invention solves this problem and results in an LP engine which can be much more easily started.

SUMMARY OF THE INVENTION

The present invention relates to a system for regulating fuel flow in a fuel line from a supply of fuel to an engine. One embodiment in particular relates to use on engines which use liquid propane as their fuel.

In one embodiment, the invention comprises:

a) a fuel regulator disposed in the fuel line intermediate of the engine and the fuel supply regulating the flow of fuel to the engine;

b) vacuum lockoff apparatus, disposed in the fuel line intermediate of the fuel regulator and the fuel supply and connected to the engine by an air passageway, sensing a partial vacuum condition at the engine, the vacuum lockoff means allowing flow of fuel in the fuel line when a partial vacuum condition is sensed and prohibiting flow of fuel in the fuel line when the partial vacuum condition is no longer sensed;

c) one way check valve, disposed intermediate of the engine and the vacuum lockoff means in the air passageway, maintaining partial vacuum condition at the vacuum lockoff means; and d) bypass valve means, connected to the air passageway so as to provide an air passageway bypassing the one way check valve, for allowing restricted flow of air to the vacuum lockoff apparatus whereby the partial vacuum condition at the vacuum lockoff apparatus is nullified in a predetermined period of time so that fuel flow is prohibited once the engine has been stopped for the predetermined period of time.

In one embodiment, the vacuum lockoff apparatus is connected by the air passageway to a crank case of the engine. In yet other embodiments, the vacuum lockoff apparatus is connected by the air passageway to an intake manifold of the engine.

In one embodiment, the partial vacuum condition is maintained for roughly five seconds at the vacuum lockoff apparatus after the partial vacuum condition at the engine has ceased to exist.

Yet another embodiment of the invention relates to a method of regulating fuel flow in a fuel line from a supply of fuel to an engine. In one embodiment, the method comprises:

a) sensing at a vacuum lockoff apparatus, disposed in the fuel line, a partial vacuum condition at the engine;

b) allowing fuel flow so long as the partial vacuum condition is sensed at the vacuum lockoff apparatus; and c) maintaining the partial vacuum condition at the vacuum lockoff apparatus a predetermined time after the partial vacuum condition at the engine no longer exists whereby fuel flow is allowed for a predetermined period of time even after the engine stops or is no longer being cranked.

These and various other features and advantages of novelty which characterize the invention are pointed out with particularity in the claims annexed hereto and forming a part hereof. However, for a better understanding of the invention, its advantages and objects obtained by its use, reference should be had to the drawings which form a further part hereof, and to the accompanying descriptive matter, in which there is illustrated and described a preferred embodiment of the invention.

BRIEF DESCRIPTION OF THE DRAWINGS

In the drawings in which like reference numerals and letters generally indicate corresponding parts throughout the several views.

DETAILED DESCRIPTION OF A PREFERRED EMBODIMENT

Figure 1:
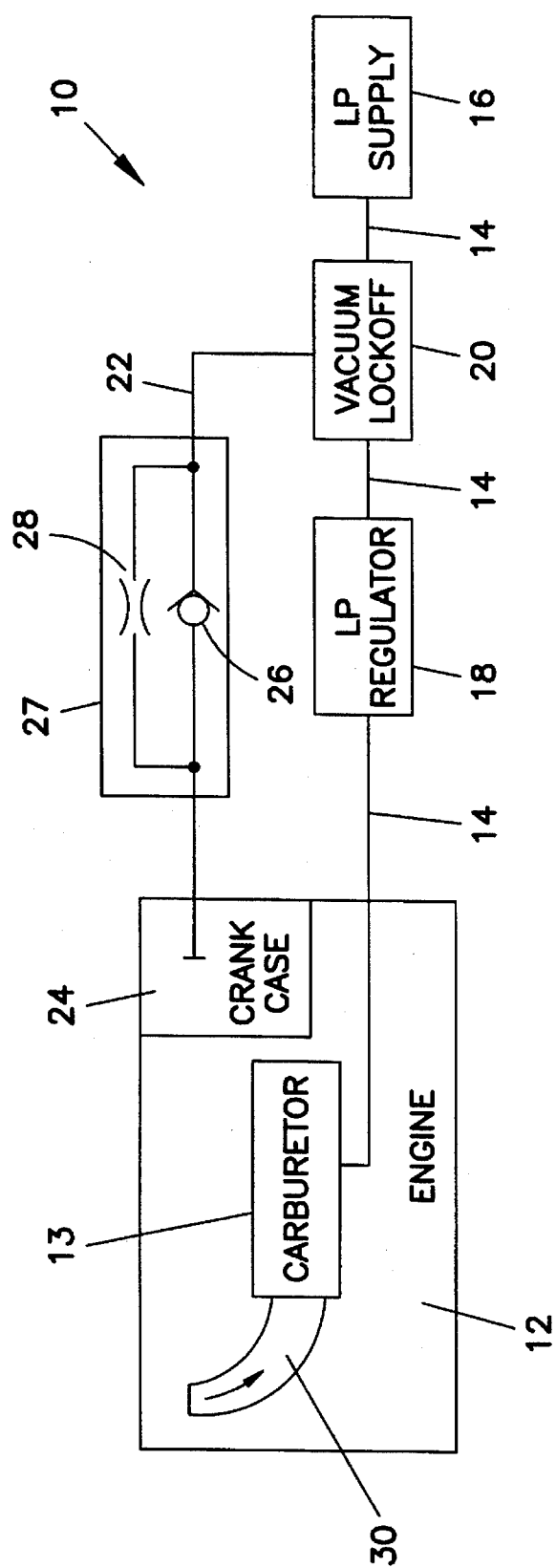
FIG. 1 is a block diagram of an embodiment of a system in accordance with the principles of the present invention.

Referring now to FIG. 1 there is shown an embodiment of a system and method in accordance with the principles of the present invention, the system being generally referred to by the reference numeral 10. The embodiment is shown being used on an engine 12, a carburetor 13 of which is interconnected by a fuel line 14 to a supply 16 of liquid propane fuel. A fuel regulator 18 of the vacuum demand type is shown disposed in the fuel line 14. Also disposed in the fuel line 14 intermediate of the regulator 18 and the fuel supply 16 is a vacuum lockoff apparatus 20. The vacuum lockoff apparatus functions as an on/off valve switching fuel flow on/off.

In the embodiment shown, the vacuum lockoff apparatus 20 is interconnected by an air passageway 22 to a crankcase 24 of the engine 12. When the vacuum lockoff apparatus 20 senses a partial vacuum condition at the engine's crankcase 24 such as when the engine is running or being cranked during starting, the vacuum lockoff apparatus 20 allows fuel flow to the regulator 18. When the partial vacuum condition is no longer sensed, the vacuum lockoff apparatus 20 prohibits flow of fuel to the regulator.

Disposed in the air passageway 22 between the vacuum lockoff apparatus 20 and the crankcase 24, is a vacuum diode apparatus 27 which includes a one way check valve 26 which allows air flow from the vacuum lockoff apparatus 20 to the crankcase 24 but not in the opposite direction and a bypass valve 28 which provides a bypass around the one way check valve 26. The bypass valve 28 is a bleed orifice type of valve which, in one embodiment, allows the partial vacuum condition at the vacuum lockoff apparatus 20 to exist for roughly five seconds after the condition no longer exists at the crankcase 24. Accordingly the vacuum diode 27 serves to maintain a constant partial vacuum condition on one side, the vacuum lockoff apparatus side, in the presence of a varying vacuum condition on the other side, the engine side.

The present invention enables fuel flow to the engine to be continuous and not interrupted even though the partial vacuum condition at the engine 12 might be interrupted such as during engine cranking when starting and between recoil start pulls. This facilitates the starting process and makes for much easier starting.

It will be appreciated that alternative embodiments might be utilized in keeping with the principles of the present invention. For example, the air passageway 22 might be interconnected to an intake manifold 30 of the engine 12 as opposed to the crankcase 24.

Figure 2:
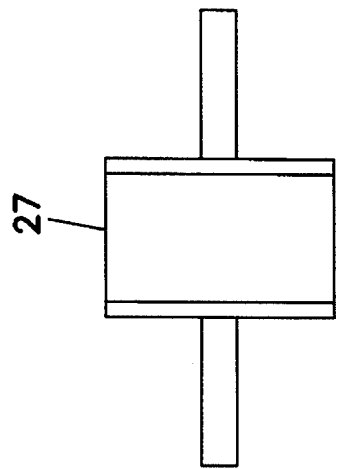
FIG. 2 is a side elevational view of an embodiment of a bypass valve used in the present invention.

An embodiment of the vacuum diode 27 housing the bypass valve 28 is shown in FIG. 2. The embodiment of the vacuum diode 27 shown exhibits a drop of fifteen inches mercury to five inches mercury in five seconds plus or minus two seconds.

Having read the foregoing description, it is to be understood, that even though numerous characteristics and advantages of various embodiments in accordance with the principles of the invention have been set forth in the foregoing description, together with details of the structure and function of the invention, the disclosure is illustrative only, and changes may be made in detail, especially matters of shape, size and arrangement of the parts within the principles of the invention to the full extent indicated by the broad general meaning of the term in which the appended claims are expressed.

What is claimed is:

1. A system for regulating fuel flow in a fuel line from a supply of fuel to an engine, comprising:

a) a fuel regulator disposed in the fuel line intermediate of the engine and the fuel supply regulating the flow of fuel to the engine;

b) a vacuum lockoff apparatus, disposed in the fuel line intermediate of the fuel regulator and the fuel supply and connected to the engine by an air passageway, sensing a partial vacuum condition at the engine, the vacuum lockoff apparatus allowing flow of fuel in the fuel line when a partial vacuum condition is sensed and prohibiting flow of fuel in the fuel line when the partial vacuum condition is no longer sensed;

c) a one way check valve, disposed intermediate of the engine and the vacuum lockoff apparatus in the air passageway, maintaining partial vacuum condition at the vacuum lockoff means; and d) bypass valve means, connected to the air passageway so as to provide an air passageway bypassing the one way check valve, for allowing restricted flow of air to the vacuum lockoff apparatus whereby the partial vacuum condition at the vacuum lockoff apparatus is nullified in a predetermined period of time so that fuel flow is prohibited once the engine has been stopped for the predetermined period of time.

2. An system in accordance with claim 1, wherein the vacuum lockoff apparatus is connected by the air passageway to a crank case of the engine.

3. An system in accordance with claim 1, wherein the fuel is liquid propane.

4. An system in accordance with claim 1, wherein the partial vacuum condition is maintained for approximately five seconds at the vacuum lockoff apparatus.

5. A method of regulating fuel flow in a fuel line from a supply of fuel to an engine for facilitating starting the engine, the method comprising the steps of:

a) sensing at a vacuum lock off apparatus, disposed in the fuel line, a partial vacuum condition at the engine;

b) allowing fuel flow so long as the partial vacuum condition is sensed at the vacuum lock off apparatus; and c) maintaining the partial vacuum condition at the vacuum lock-off apparatus a predetermined time after the partial vacuum condition at the engine no longer exists, wherein during the predetermined time, the partial vacuum condition at the vacuum lock-off apparatus allows continued fuel flow to the engine despite the nonexistence of the partial vacuum condition at the engine.

6. A method in accordance with claim 5 wherein the partial vacuum condition at the vacuum lockoff apparatus is maintained for approximately five seconds after the partial vacuum condition at the engine no longer exists.

\* \* \* \* \*